(12) United States Patent
Satou et al.

(10) Patent No.: US 6,405,835 B1
(45) Date of Patent: Jun. 18, 2002

(54) HYDRAULIC MOTOR WITH BRAKE DEVICE

(75) Inventors: Hitoshi Satou, Tsuchiura; Kazuyuki Ino, Makabe-machi; Yoshinori Takeuchi, Tsuchiura, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/743,062

(22) PCT Filed: Apr. 19, 2000

(86) PCT No.: PCT/JP00/02542

§ 371 (c)(1),
(2), (4) Date: Jan. 4, 2001

(87) PCT Pub. No.: WO00/68568

PCT Pub. Date: Nov. 16, 2000

(30) Foreign Application Priority Data

May 7, 1999 (JP) ............................................. 11-127708

(51) Int. Cl.[7] .............................................. F16D 55/36
(52) U.S. Cl. ..................... 188/71.5; 188/71.6; 188/170; 188/264 D
(58) Field of Search ............................. 188/71.4, 71.5, 188/71.6, 73.1, 166, 170, 218 XL, 264 R, 264 B, 264 D, 264 CC; 192/70.2; 403/359.1, 359.6

(56) References Cited

U.S. PATENT DOCUMENTS 3,621,945 A * 11/1971 Spry ........................ 188/71.5
4,838,832 A * 6/1989 Schmitt et al. ............. 464/162
5,664,655 A * 9/1997 Oh ............................ 192/70.2

FOREIGN PATENT DOCUMENTS

| EP | 0 797 020 A1 | * 9/1997 |
| JP | 62-175271 | 11/1987 |
| JP | 7-310644 | 11/1995 |
| JP | 9-112405 | 5/1997 |

* cited by examiner

Primary Examiner—Christopher P. Schwartz
Assistant Examiner—Thomas J. Williams
(74) Attorney, Agent, or Firm—Mattingly, Stanger & Malur, P.C.

(57) ABSTRACT

A hydraulic motor capable of minimizing a wear caused on a rotating brake disk of a brake device, wherein a rotating brake disk (32) which forms a plurality of arc-shaped grooves (17) apart from each other in circumferential direction and constitutes a brake device (31) is provided on the outer peripheral side of a cylinder block (15), and a plurality of arc-shaped projections (33) engaged with the arc-shaped grooves (17) and a plurality of radial contact parts (34) are provided on the inner peripheral side of the rotating brake disk (32) and the plurality of radial contact parts (34) are allowed to face the outer peripheral surface of the cylinder block (15) so that they can be brought into contact with each other, whereby, at the time of braking of the hydraulic motor (10), the movement of the rotating brake disk (32) in rotating direction is controlled by the arc-shaped projections (33) and the movement of the rotating brake disk (32) in radial direction is controlled by the radial contact parts (34).

5 Claims, 12 Drawing Sheets

HYDRAULIC MOTOR WITH BRAKE DEVICE

TECHNICAL FIELD

This invention relates to a brake device equipped hydraulic motor which is suitable for use, for example, as a hydraulic motor of a rotary drive mechanism or vehicular drive mechanism of a excavator or the like.

BACKGROUND ART

Illustrated by way of example in FIGS. 8 through 13 is a prior art brake device equipped hydraulic motor which is applied as a hydraulic motor of a excavator rotary mechanism.

In these figures, indicated at 1 is a vehicular lower body, at 2 an upper rotary body which is rotatably mounted on the vehicular lower body 1. Provided on the upper rotary body 2 is a frame 3 to support thereon a cab 4, a housing cover 5 which internally defines a machine room and a counterweight 6. Further, provided on a front portion of the upper rotary body 2 is a front working mechanism 7 with a member to be lifted up and down, for example, to perform an excavating operation. Being rotationally driven from a hydraulic motor 10 as described below, the upper rotary body 2 is rotated relative to the vehicular lower body 1.

The hydraulic motor 10 of a rotary body drive mechanism (hereinafter referred to simply as "hydraulic motor") is mounted on the rotary frame 3 of the upper rotary body 2 through a reducer (not shown), and, as described below, largely constituted by a casing 11, output shaft 14, cylinder block 15 and a brake device 22.

As shown in FIG. 9, the casing 11 of the hydraulic motor 10 is constituted by a main casing body 12 of a stepped tubular shape provided with a cylindrical portion 12A and bottom portion 12B which is closed at a bottom end thereof, and a head casing 13 which is adapted to close the other open end of the main casing body 12. Further, the main casing body 12 is provided with an annular flange 12C around an outer periphery of its bottom portion 12B. The casing 11 is disposed in a vertical direction, and the flange 12C at its lower end is integrally fixed to a reducer.

Furthermore, on the inner peripheral side, the main casing body 12 is provided with a couple of stepped portions 12D and 12E by which the inside diameter of the main casing body 12 is increased stepwise toward its open end. Provided on the stepped portion 12 are a large number of coupling grooves 12F (only two of which are shown in the drawing) at intervals around the inner periphery or in the circumferential direction for engagement with non-rotating brake disks 23 which will be described hereinafter.

Indicated at 14 is an output shaft which is rotatably supported in the casing 11. More specifically, the output shaft 14 is rotatably supported by the main casing body 12 through a bearing 14A in the vicinity of its bottom portion 12B and at the same time by the head casing 13 through a bearing 14B.

Denoted at 15 is a cylinder block which is provided within the casing 11. The cylinder block 15 is splined with and supported on the output shaft 14. In this instance, a plural number of cylinders 16 are formed axially in the cylinder block 15 in angularly spaced positions around the circumference of the output shaft 14. To and from the cylinder block 15, operating oil is supplied from outside through inlet/outlet ports 18A and 18B, which will be described hereinafter, thereby to rotationally drive the output shaft 14.

Indicated at 17 are, for example, nine arcuate grooves which are provided on the outer peripheral side of the cylinder block 15. These arcuate grooves 17 are each in the form of a semi-circular groove which is extended in the axial direction of the cylinder block 15 and located substantially in equidistant positions around the circumference of the cylinder block 15. In this instance, as shown in FIG. 12, the arcuate grooves 17 are formed in a predetermined radius of curvature R1 which is, for example, approximately 10.00 mm.

Designated at 18 is a valve plate which is provided between the head casing 13 and the cylinder block 15 and fixed to the head casing 13. This valve plate 18 is provided with a pair of inlet/outlet ports 18A and 18B which are intermittently communicated with the respective cylinders 16 of the cylinder block 15. These inlet and outlet ports 18A and 18B are communicated with an oil supply passage (not shown) which is formed on the side of the head casing 13.

Indicated at 19 are a plural number of pistons each having one end portion (an upper end portion) slidably fitted in a cylinder 16 of the cylinder block 15 and having the other end portion (a lower end portion) projected to the outside of the cylinder 16. Each piston 19 is provided with a shoe 20 rockably at the projected lower end.

Denoted at 21 is a swash plate which is fixedly provided in the main casing body 12. The pistons 19 are reciprocated into and out of the cylinders 16 as the shoes 20 of the respective pistons 19 are caused to slide on the upper side of the wash plate 21.

Indicated at 22 is a negative type brake device which is provided for applying brakes to the output shaft 14 and the cylinder block 15. This brake device 22 is constituted by non-rotating brake disks 23, rotating brake disks 24, a brake piston 27 and so forth, as described below.

Indicated at 23 are the non-rotating brake disks which are provided on the inner peripheral side of the main casing body 12 between the stepped portions 12D and 12E. These non-rotating brake disks 23 are each in the form of an annular disk using a friction material and, on the outer peripheral side, are engaged with the coupling grooves 12F of the main casing body 12. Consequently, the non-rotating brake disks 23 are axially movable relative to the main casing body 12 but blocked against rotation relative to the latter.

Designated at 24 are the rotating brake disks which are provided on the outer peripheral side of the cylinder block 15. As shown in FIG. 10, the rotating brake disk 24 are each in the form of an annular disk using a friction material (lining), and are located on the outer peripheral side of the cylinder block 15 in an alternately overlapped state with the non-rotating brake disks 23.

By way of arcuate projections 25 which will be described below, the rotating brake disks 24 are made movable in the axial direction relative to the cylinder block 15, and can be brought into friction engagement with the non-rotating brake disks 23 to apply brakes to the cylinder block 15 in cooperation with the non-rotating brake disks 23.

Indicated at 25 are nine arcuate projections which are provided on the inner peripheral side of each rotating brake disk 24 and projected radially inward in an arcuate shape, from uniformly spaced angular positions on the inner periphery of the rotating disk 24. These arcuate projections 25 are engaged with the arcuate grooves 17 on the side of the cylinder block 15 to restrict movements of the rotating brake disks 24 in rotational directions relative to the cylinder block 15.

In this instance, as shown in FIG. 12, the arcuate projections 25 are formed in a predetermined radius of curvature R2 which is slightly smaller than the radius of curvature R1 of the above-mentioned arcuate grooves 17 and which is, for example, approximately 9.75 mm.

Designated at 26 are nine grooves which are formed between adjacent arcuate projections 25 and are located in equidistant positions on the inner periphery of each rotating brake disk 24 alternately with the arcuate projections 25.

Indicated at 27 is a brake piston which is axially slidably fitted in the main casing body 12. This brake piston 27 is formed in a stepped cylindrical shape to define a liquid pressure chamber 28 in association with the stepped portion 12E of the main casing body 12. Further, under the influence of biasing action of a spring 29, the brake piston 27 is constantly urged toward the non-rotating and rotating brake disks 23 and 24. Consequently, the non-rotating and rotating brake disks 23 and 24 are held in frictional engagement with each other by the brake piston 27, and the cylinder block 15 is retained in a braked state together with the output shaft 14 by application of the so-called parking brake.

Further, the casing 11 is provided with a liquid passage (not shown) which is communicated with the above-mentioned liquid pressure chamber 28. When part of pressure oil from a hydraulic pump (not shown) is supplied to the liquid pressure chamber 28 through the liquid passage, the brake piston 27 moved away from the non-rotating brake disks 23 to take the brake off the cylinder block 15.

In the case of the prior art hydraulic motor 10 of this sort, pressure oil from a hydraulic pump is successively supplied to the respective cylinders 16 through the inlet/outlet ports 18A and 18B of the valve plate 18, thereby generating pressures to push the pistons 19 against the swash plate 21 through the shoes 20. Accordingly, the shoes 20 are caused to slide on the swash plate 21 in the circumferential direction, and as a result the cylinder block 15, which is integrally assembled with the pistons 19, is put in rotation. At this time, the rotational force is transmitted to a reducer through the output shaft 14 to rotate the upper rotary body 2 on and relative to the vehicular lower body 1.

When the hydraulic motor 10 is in operation in this manner, part of pressure oil from a hydraulic pump is also supplied to the liquid pressure chamber 28, causing the brake piston 27 to displace in an upward direction in FIG. 9 against the action of the spring 29 to take the brakes off the cylinder block 15.

On the other hand, at the time of stopping the hydraulic motor 10, the supply of pressure oil to the liquid pressure chamber 28 is turned off, whereupon the brake piston 27 is pushed by the spring 29 toward the non-rotating brake disks 23 to bring the non-rotating brake disks 23 on the side of the casing 11 into frictional engagement with the rotating brake disks 24 on the side of the cylinder block 15 to stop the rotation of the latter.

According to the above-described prior art, at the time of stopping the hydraulic motor 10, the non-rotating and rotating brake disks 23 and 24 are forcibly pressed together against the casing 11 by the brake piston 27, and as a result non-rotatably fixed to the casing 11 which is integrally mounted on the upper rotary body 2.

However, in the case of the prior art, substantially a small gap space exists between the arcuate grooves 17 on the cylinder block 15 and the arcuate projections 25 on the rotating brake disks 24 as shown in FIG. 12. Therefore, when the brake device 22 is actuated to apply the brakes on the cylinder block 15 to stop a rotational movement of the upper rotary body 2, the so-called "back swinging" motions may occur to the upper rotary body due to its repeated forward and reverse inertial rotations. In such a case, the arcuate projections 25 of the rotating brake disks 24, which are fixed to the casing 11 as mentioned hereinbefore, are repeatedly hit against the arcuate grooves 17 of the cylinder block 15 which is connected to the side of the vehicular lower body 1 through a reducer, to suffer from abrasive wear as shown in FIG. 13.

Besides, when traveling on an unlevel ground, backlashing or saccadic movements may occur, for example, to meshed gears of the reducer or to mechanical components on the side of the front working mechanism, causing the arcuate projections 25 of the rotating brake disks 24 to hit against the arcuate grooves 17 of the cylinder block 15 frequently and repeatedly to suffer from accelerated abrasive wear.

With progress of the abrasive wear of the arcuate projections 25 as described above, the gap spaces between the arcuate projections 25 and the arcuate grooves 17 are widened to increase the impact of collision and the abrasive wear of the arcuate projections 25 all the more. In some cases, the arcuate projections 25 are worn out or damaged totally or to such a degree as to impair the braking functions.

In addition, since the hydraulic motor 10 is disposed vertically, lower ones of the rotating brake disks 24 are subjected to all the weights of the rotating and non-rotating brake disks 24 and 23 which are in upper positions.

Therefore, when applying the brakes to the hydraulic motor 10, an extremely large inertial force is exerted on lower ones of the rotating brake disks 24 to increase the impacts of collision of the arcuate projections 25 of the rotating brake disks 24 against the arcuate grooves 17 of the cylinder block 15 and thus to increase the degree of abrasive wear of the arcuate projections 25.

Further, dust which results from abrasion of the arcuate projections 25 could get onto sliding parts of the hydraulic motor 10 to cause problems such as galling or seizure of the sliding parts which would invite degradations in performance quality of the hydraulic motor 10.

In this connection, it is possible to suppress abrasive wear of the rotating brake disks to some extent by increasing contact areas with the cylinder block, more specifically, by providing flat spline grooves on the cylinder block 15 in place of the arcuate grooves 17 while providing on the rotating brake disks flat projections, in place of the arcuate projections 25, for fitting engagement with the grooves.

However, in such a case, it becomes necessary to form spline grooves on the cylinder block by a machining operation using a hobbing machine or the like, which is time consuming and could drop production efficiency to a material degree.

DISCLOSURE OF THE INVENTION

In view of the above-mentioned problems with the prior art, it is an object of the present invention to provide a brake device equipped hydraulic motor, which is arranged to suppress abrasive wear of rotating brake disks to a sufficiently low level at the time of application of the brakes to maintain satisfactory braking performance quality over a long period of time, while precluding causes of abrasion and galling of sliding parts and guaranteeing facilitated machining operations.

In order to solve the above-mentioned problems, according to the present invention, there is provided a brake device equipped hydraulic motor of the type which basically includes a casing formed generally in a tubular shape, an output shaft rotatably supported in the casing, a cylinder block provided in the casing and supplied with pressure oil from outside to rotationally drive the output shaft, and a brake device provided between the cylinder block and the casing to apply brakes to the output shaft, the brake device having annular non-rotating brake disks provided on inner peripheral side of the casing, annular rotating brake disks provided axially movably on outer peripheral side of the cylinder block in alternately overlapped relations with the non-rotating brake disks adapted to be brought into frictional engagement with the non-rotating brake disks by a brake piston.

The brake device equipped hydraulic motor according to the present invention is characterized by the provision of: a plural number of axially extending arcuate grooves provided on circumferential surfaces of the cylinder block at predetermined angular intervals in a circumferential direction thereof; a plural number of arcuate projections provided on inner peripheral side of and extended radially inward of the rotating brake disks and engaged with the arcuate grooves to restrict rotational movements of the rotating brake disks relative to the cylinder block; and at least three radial contacting land portions each located between said arcuate projections and arranged to be brought into contact circumferential surfaces of the cylinder block to restrict radial movements of the rotating brake disks relative to the cylinder block.

With the arrangements just described, at the time of braking the hydraulic motor, a plural number of rotating brake disks which are provided on the side of the cylinder block are pushed into frictional engagement with a plural number of non-rotating brake disks by a brake piston of the brake device thereby to stop rotation of the cylinder block. At this time, the arcuate projections which are projected on the inner peripheral side of the rotating brake disks are engaged with arcuate grooves on the circumferential surfaces of the cylinder block to restrain rotational movements of the rotating brake disks relative to the cylinder block.

Besides, at the time of application of the brakes, the radial contacting land portions which are provided on the inner peripheral side of the rotating brake disks are brought into contact with circumferential surfaces of the cylinder block to restrict radial movements of the rotating brake disks relative to the cylinder block. Accordingly, the radial contacting land portions contribute to ease the impacts of collision as the arcuate projections are collided against the arcuate grooves of the cylinder block in radial directions.

Further, according to the present invention, the radial contacting land portions are formed in an arcuate shape conforming with contour of the circumferential surfaces of the With the arrangements just described, when the rotating brake disks tend to move in a radial direction relative to the cylinder block upon application of the brakes, the radial contacting land portions are brought into contact with circumferential surfaces of the cylinder block, preventing the arcuate projections from directly colliding against the arcuate grooves in a radial direction.

Further, according to the present invention, in addition to the arcuate projections and radial contacting land portions, the rotating brake disks are provided with grooves deeper than the radial contacting land portions, providing oil passages between the grooves and the circumferential surfaces of the cylinder block.

With the arrangements just described, for example, as oil is fed to and from the cylinder block, leaked oil in the casing can find escape passages to the outside through the oil passages which are formed between the grooves of the rotating brake disks and the cylinder block. Accordingly, this prevents the oil pressure in the casing from rising to an unnecessarily high level.

On the other hand, according to the present invention, there is also provided a brake device equipped hydraulic motor which basically includes a casing formed generally in a tubular shape, an output shaft rotatably supported in the casing, a output shaft provided in the casing and supplied with pressure oil from outside to rotationally drive the output shaft, and a brake device provided between the output shaft and the casing to apply brakes to the output shaft, the brake device having annular non-rotating brake disks provided movably on inner peripheral side of the casing, annular rotating brake disks provided on outer peripheral side of the output shaft in alternately overlapped relations with the non-rotating brake disks adapted to be brought into frictional engagement with the non-rotating brake disks by a brake piston.

In this case, according to the present invention, the brake device equipped hydraulic motor is characterized by the provision of: a plural number of axially extending arcuate grooves provided on circumferential surfaces of the output shaft at predetermined angular intervals in a circumferential direction thereof; a plural number of arcuate projections provided on inner peripheral side of and extended radially inward of the rotating brake disks and engaged with the arcuate grooves to restrict rotational movements of the rotating brake disks relative to the output shaft; and at least three radial contacting land portions each located between the arcuate projections and arranged to be brought into contact circumferential surfaces of the output shaft to restrict radial movements of the rotating brake disks relative to the output shaft.

With the arrangements just described, at the time of braking the hydraulic motor, the radial contacting land portions which are provided on the inner peripheral side of the rotating brake disks are engaged with circumferential surfaces of the output shaft thereby to restrict radial movements of the rotating brake disks relative to the output shaft in a manner similar to the above-described first preferred form of the invention, contributing to ease the impact of collision between the arcuate projections and the arcuate grooves of the output shaft.

Further, according to the present invention, the radial contacting land portions are formed in an arcuate shape conforming with contour of the circumferential surfaces of the output shaft, and arranged to face the circumferential surfaces of the output shaft through a small gap space narrower than a gap space between the arcuate grooves and arcuate projections.

With the arrangements just described, when the rotating brake disks tend to move in a radial direction relative to the output shaft upon applying the brakes, the radial contacting land portions are brought into contact with circumferential surfaces of the output shaft to prevent the arcuate projections from directly colliding against the arcuate grooves in radial directions.

Further, according to the present invention, in addition to the arcuate projections and radial contacting land portions, the rotating brake disks are provided with grooves deeper than the radial contacting land portions, providing oil passages between the grooves and the circumferential surfaces of the output shaft.

With the arrangements just described, for example, as oil is fed to and from the cylinder block, leaked oil in the casing can find escape passages to the outside through the oil passages which are formed between the grooves of the rotating brake disks and the cylinder block. Accordingly, this prevents the oil pressure in the casing from rising to an unnecessarily high level in a manner similar to the above-described third preferred form of the invention.

Furthermore, according to the present invention, the arcuate projections are formed in a slightly smaller radius of curvature as compared with the arcuate grooves. This arrangement permits to assemble the arcuate projections with the arcuate grooves in a facilitated manner in an assembling stage.

BEST MODE FOR CARRYING OUT THE INVENTION

Figure 1:
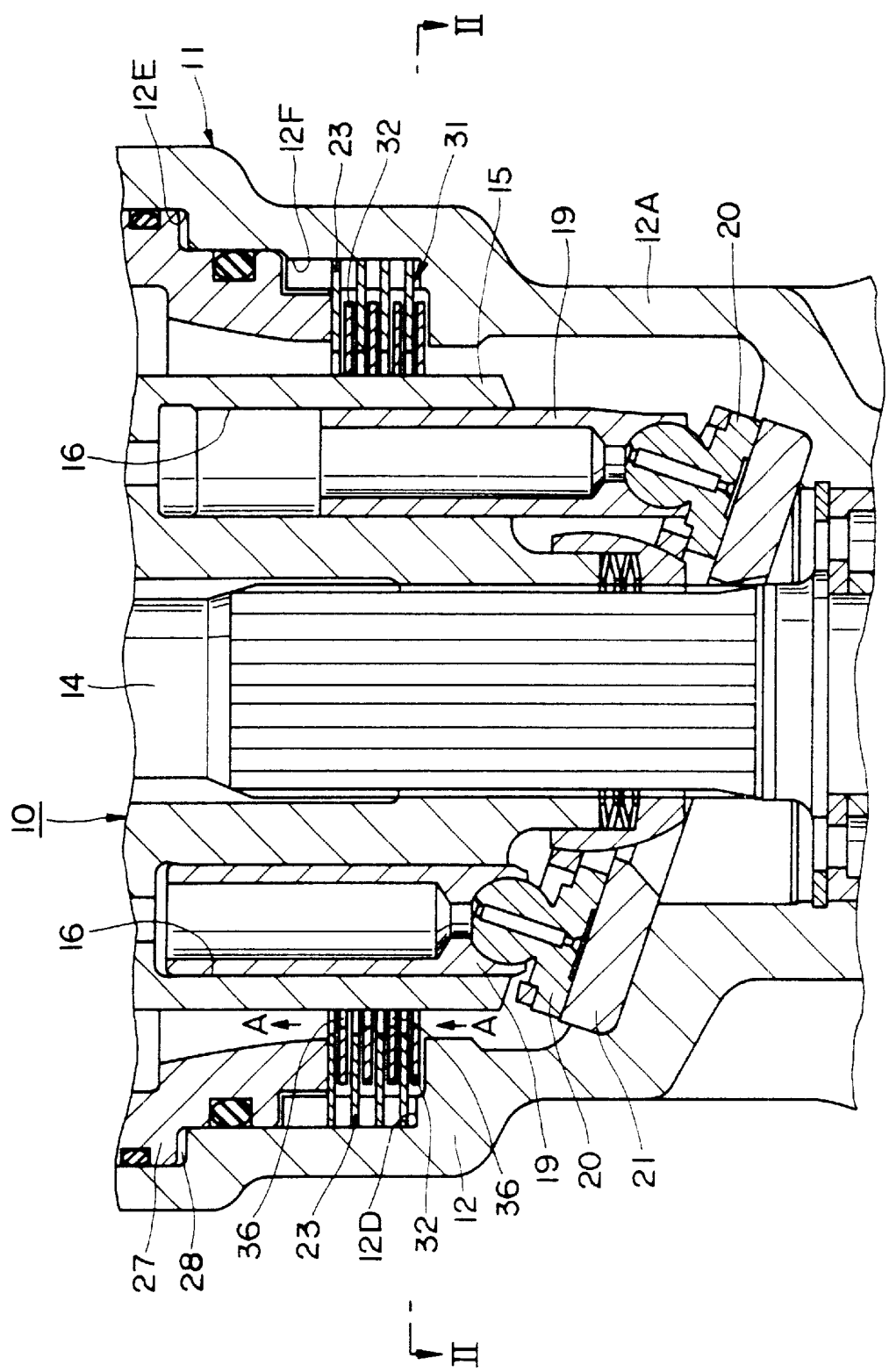
FIG. 1 is a vertical sectional view of a brake device equipped hydraulic motor according to a first embodiment of the present invention, taken from the direction of arrows I—I in FIG. 2.

Hereafter, the present invention is described more particularly by way of its preferred embodiments with reference to the accompanying drawings. In the following description, those component parts which are common with the above-mentioned prior art counterpart are designated by common reference numerals or characters to avoid repetitions of same explanations.

Shown in FIGS. 1 to 4 is a first embodiment of the present invention, in which indicated at 31 is a brake device adopted in the present embodiment. Substantially similarly to the prior art brake device 22, the brake device 31 is constituted by non-rotating brake disks 23, brake piston 27 and rotating brake disks 32 as described below.

Figure 2:
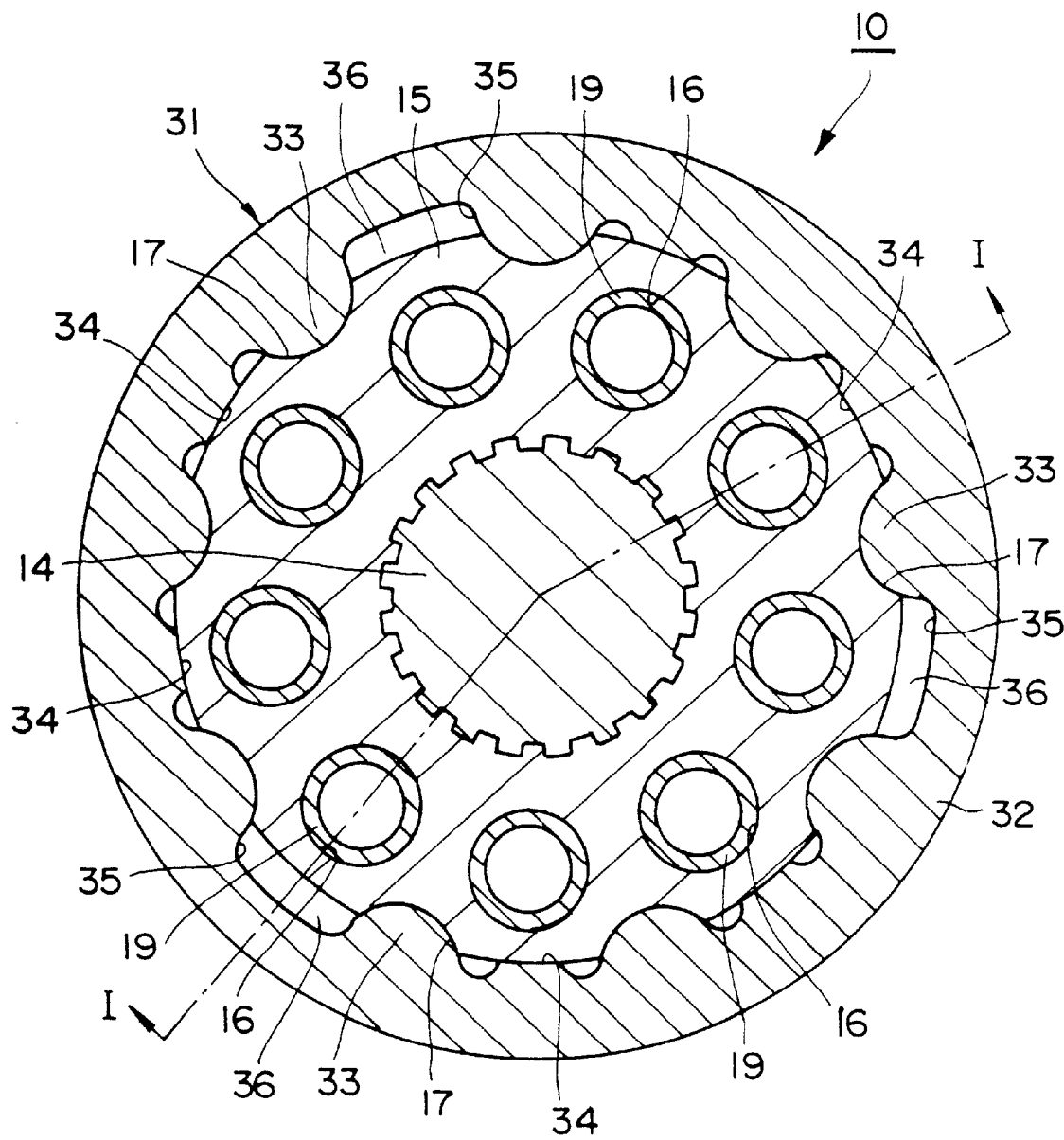
FIG. 2 is a transverse sectional view on an enlarged scale of the brake device equipped hydraulic motor, taken from the direction of arrows II—II in FIG. 1 and showing a cylinder block, rotating brake disks and so forth.
Figure 3:
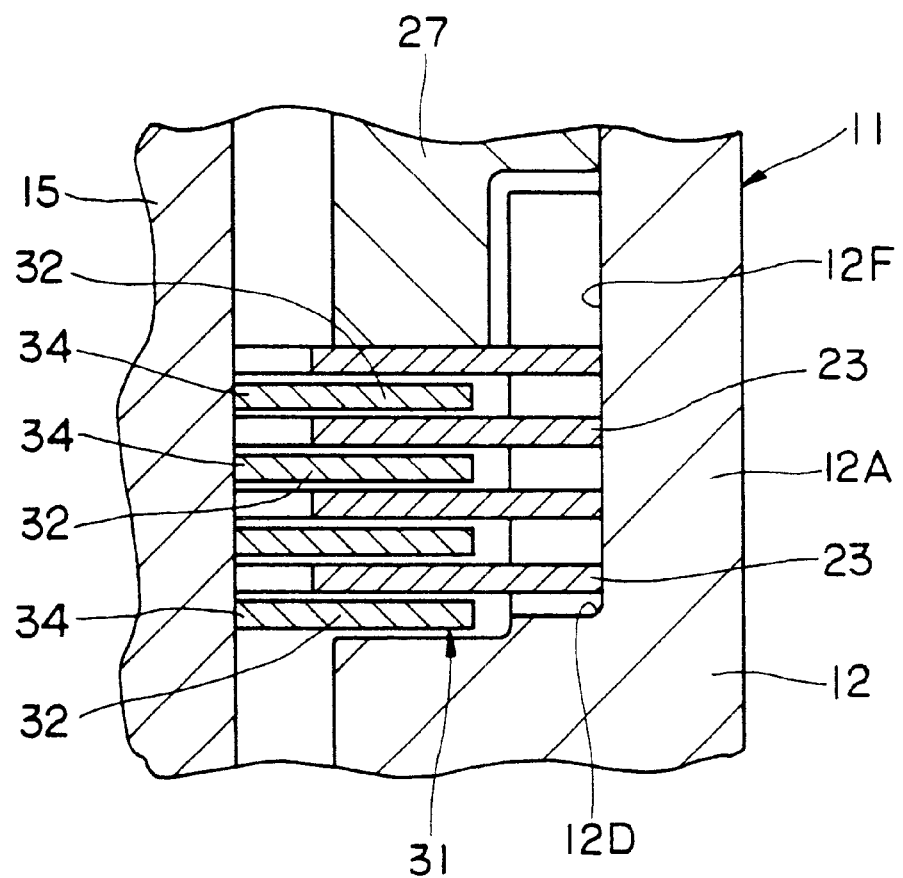
FIG. 3 is a fragmentary sectional view on an enlarged scale of a brake device shown in FIG. 1.

Indicated at 32 are a plural number of rotating brake disks which are adopted in the present embodiment and which are provided around the outer periphery of a cylinder block 15. As shown in FIG. 2, these rotating brake disks 32 are formed by machining friction material into the shape of annular disks in a manner similar to the prior art rotating brake disks 24, and provided with arcuate projections 33 and flat-bottom grooves 35 on the inner peripheral side as described below.

The rotating brake disks 32, however, differ from the prior art counterpart in that, in addition to the arcuate projections 33 and grooves 35, radial contacting portions 34 are provided on the inner peripheral side thereof.

Figure 4:
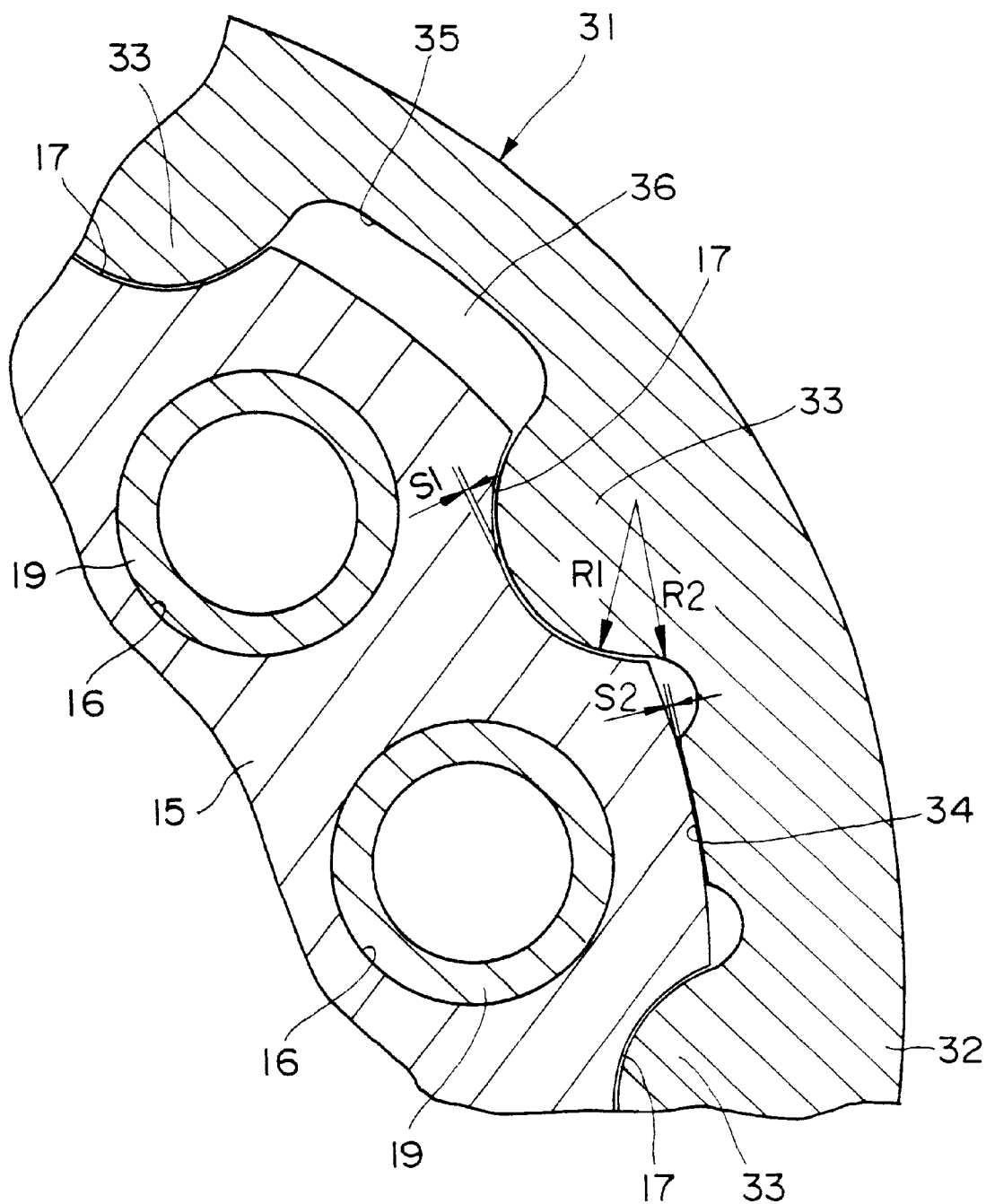
FIG. 4 is an enlarged fragmentary sectional view, through arcuate grooves, arcuate projections and radial contacting portions shown in FIG. 2.

Denoted at 33 are, for example, nine arcuate projections which are projected radially inward from the inner periphery of each rotating brake disk 32. As shown in FIG. 4 and in a manner similar to the arcuate projections 25 in the above-described prior art hydraulic motor, these arcuate projections 33 are formed in a semi-circular shape having a radius of curvature R2 (e.g., R2=9.75 mm) which is slightly smaller than the radius of curvature R1 (e.g., R1 10.00 mm) of the arcuate grooves 17, and located substantially in equidistant angular positions around the inner periphery of the rotating brake disks 32.

Further, as shown in FIG. 4, the arcuate projections 33 are engaged with the arcuate grooves 17 through a small gap space S1 in the radial direction to restrict rotational movements of the rotating brake disks 32 relative to the cylinder block 15 when the brakes are applied on the latter.

Indicated at 34 are, for example, six radial contacting land portions which are provided at the inner peripheral ends of the rotating brake disks 32 and between the arcuate projections 33. More specifically, the radial contacting land portions 34 are formed as end portions of an arcuate shape conforming with outer peripheral surfaces of the cylinder block 15, and are located in six intervals between the arcuate projections 33, excepting three other intervals in which grooves 35 are located.

In this instance, as shown in FIG. 4, the radial contacting land portions 34 are each arranged to face an outer peripheral surface of the cylinder block 15 through a small radial gap space S2, which is narrower than the aforementioned small gap space S1 between the arcuate grooves 17 of the cylinder block 15 and opposing arcuate projections 33 of the rotating brake disks 32 (S2<S1).

Accordingly, when the rotating brake disks 32 tend to rotate relative to the cylinder block 15 at the time of applying the brakes to the cylinder block 15, the radial contacting land portions 34 come into contact with outer peripheral surfaces of the cylinder block 15 before the arcuate projections 33 fall into engagement with the arcuate grooves 17.

Indicated at 35 are three grooves which are provided at the inner periphery of the rotating brake disks 32, in every three intervals between the respective arcuate projections 33. These grooves 35 are formed deeper than the radial contacting land portions 34, and, as described below, are arranged to form oil passages 36 between the cylinder block 15 and the rotating brake disks 32.

Denoted at 36 are three oil passages which are provided between the grooves 35 of the rotating brake disks 32 and outer peripheral surface of the cylinder block 15. These oil passages 36 are arranged to guide leaked oil in the direction of arrow A in FIG. 1 through gap spaces between the cylinder block 15 and the non-rotating brake disks 23, for example, leaked oil which has leaked into the casing 11 from the cylinders 16 through a gap space between the cylinders 16 and pistons 19.

The hydraulic motor 10 with the brake device 31, according to the present embodiment employing the arrangements as described above, has no differences in particular from the prior art with regard to fundamental operating principles.

Namely, according to the present embodiment, the radial contacting land portions 34 are provided at the inner peripheries of the rotating brake disks 32 of the brake device 31 at positions between the arcuate projections 33, for engagement with outer peripheral surfaces of the cylinder block 15.

With these arrangements, when the rotating brake disks 32 tend to in a radial direction relative to the cylinder block 15 upon application of the brakes thereto, under the influence of a load of braking torque which is exerted on the rotating brake disks 32 from the non-rotating brake disks 23, the radial contacting land portions 34 are brought into contact with outer peripheral surfaces of the cylinder block 15. As a result, the above-mentioned load is supported cooperatively by the cylinder block 15 and the radial contacting land portions 34 to restrict radial movements of the rotating brake disks 32.

In addition, the small gap space S2 between the cylinder block 15 and the radial contacting land portions 34 of the rotating brake disks 32 is set at a value which is smaller than the small gap space S1 between the arcuate grooves 17 of the cylinder block 15 and the arcuate projections 33. Therefore, even when the radial contacting land portions 34 of the rotating brake disks 32 is brought into contact with outer peripheral surfaces of the cylinder block 15 in a radial direction as mentioned above, the arcuate projections 33 are prevented from directly colliding against the arcuate grooves 17 of the cylinder block 15 in a radial direction.

Thus, according to the present embodiment, even if saccadic movements may occur between the cylinder block 15 and the rotating brake disks 32 in radial and/or circumferential directions, such saccadic movements can be restricted by cooperative actions of the arcuate projections 33 and the radial contacting land portions 34. Therefore, it becomes possible to moderate the impacts of collision to which the arcuate grooves and projections 17 and 33 are subjected when braking the cylinder block 15, for the purpose of lessening the extent of abrasive wear of the arcuate projections 33 and guaranteeing higher durability and prolonged service life of the rotating brake disks 32.

Further, the radial contacting land portions 34 of the rotating brake disks 32 are brought into contact with the cylinder block 15 in addition to the arcuate projections 33, so that the contacting surface pressure of the arcuate projections 33 against the cylinder block 15 can be moderated to an extent corresponding to contacting surfaces areas of the radial contacting land portions 34. In this manner, it also becomes possible to enhance the resistance to abrasive wear of the rotating brake disks 32 as a whole, including the arcuate projections 33, through moderation of the contacting surface pressure.

Accordingly, even in a case where the hydraulic motor 10 is applied as a rotating motor for the upper rotary body 2, unchanged performance quality of the brake device 31 can be maintained over a prolonged period of time and in a stable state, as compared with the prior art counterpart which suffers form troubles such as premature abrasive wear of and damages to the rotating brake disks 32.

Further, the above arrangements contribute to reduce the amount of dust which results from abrasion of contacting surfaces of the rotating brake disks 32 with the cylinder block 15, and to prevent the dust of abrasion from getting, for example, onto sliding surfaces of the pistons 19 and cylinders 16 or onto sliding surfaces of the cylinder block 15 and the swash plate 21. Otherwise, reductions in the amount of abraded dust, which can be a cause of seizures or galling of sliding surfaces, will improve the performance quality and reliability of the hydraulic motor 10.

Further, by way of the three oil passages 36 which are provided between the cylinder block 15 and the rotating brake disks 32, oil which has leaked into the casing 11 from the cylinders 16 through clearances between the cylinders 16 and pistons 19, for example, can be guided in the direction of arrow A in FIG. 1 and returned to the side of a reservoir tank through a drain passage (not shown) which is provided in the casing 11 to prevent the oil pressure within the casing 11 from rising to an unnecessarily high level. Besides, oil can be constantly circulated through the casing 11 thereby to cool the cylinder block 15 efficiently.

Further, in a press-forming stage of the rotating brake disks 32, the radial contacting land portions 34 can be formed together with the arcuate projections 33, permitting to fabricate the rotating brake disks at a low cost and without increasing the steps of the fabrication process. In addition, since all of the arcuate projections 33 are formed in the same radius of curvature, the shape of the rotating brake disks 32, including the radial contacting land portions 34, can be simplified, permitting to form the radial contacting land portions 34 with higher accuracy in a press-forming stage for lessening errors in width of the small gap space S2 between the radial contacting land portions 34 and the cylinder block 15, thereby suppressing saccadic or rattling movements of these parts and simplifying the shape of the pressing die from the standpoint of prolonging its service life.

Further, each one of the arcuate grooves 17 to be engaged with the arcuate projections 33 of the rotating brake disks 32 can be easily machined to shape by the use of an end mill or the like as a long groove which is semi-circular in shape and extends in the axial direction of the cylinder block 15, abolishing the use of a hobbing machine as required in the prior art for forming square spline grooves, and thus contributing to make machining operations more efficient.

Figure 5:
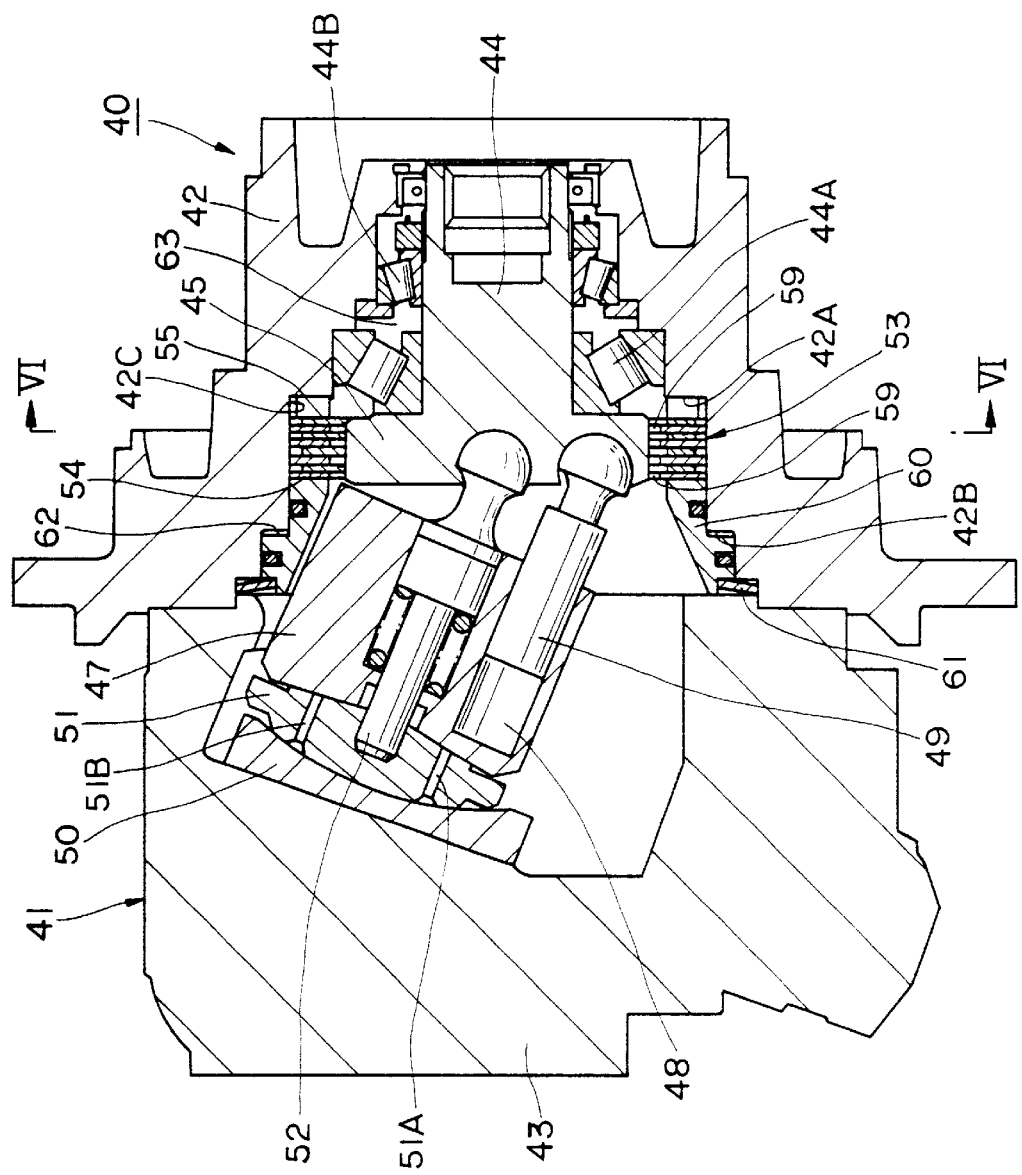
FIG. 5 is a vertical sectional view of a brake device equipped hydraulic motor according to a second embodiment of the present invention.
Figure 6:
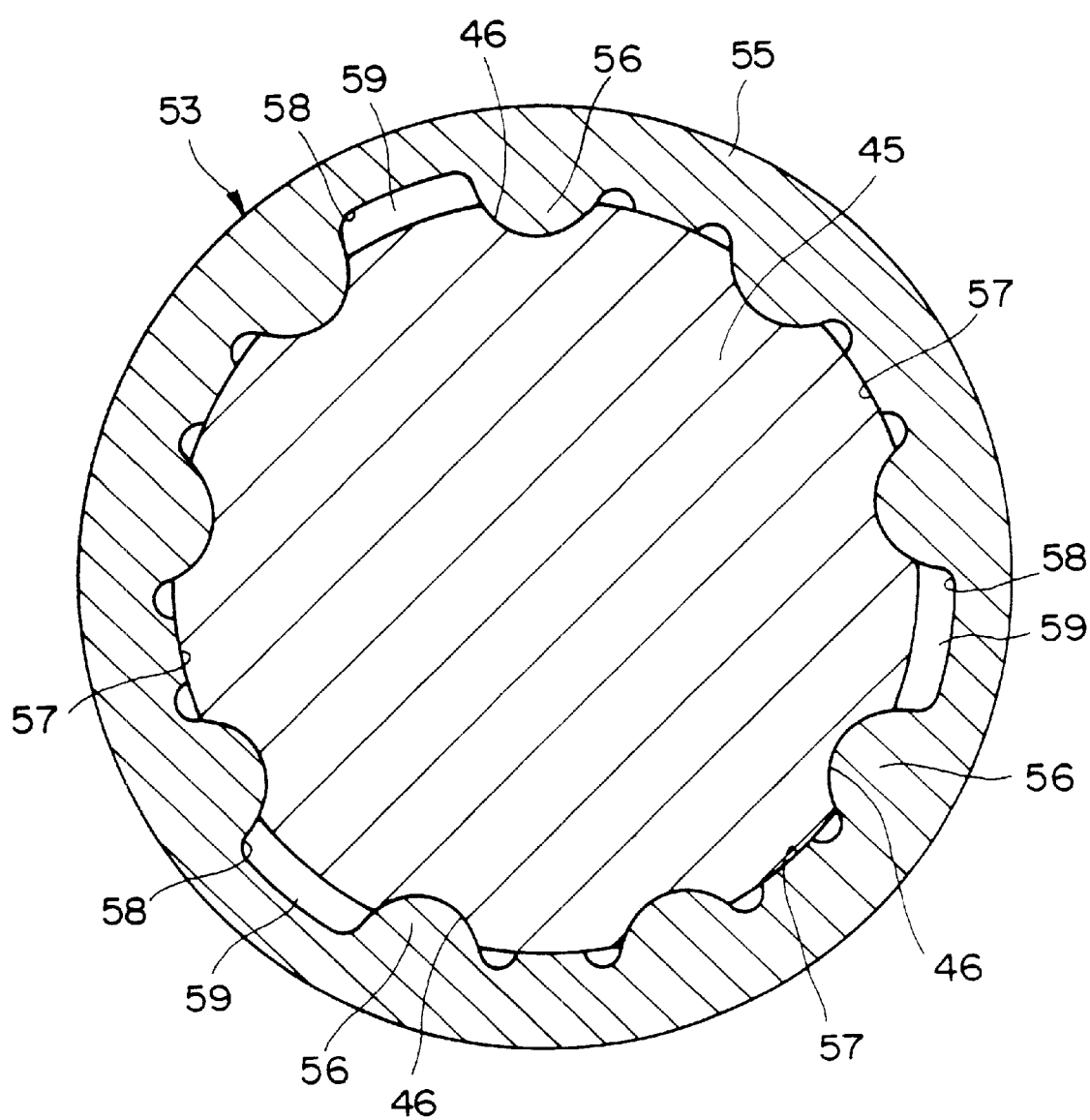
FIG. 6 is a transverse sectional view on an enlarged scale, taken from the direction of arrows VI—VI of FIG. 5 and showing drive disk, rotating brake disks and so forth.

Now, turning to FIGS. 5 and 6, there is shown a second embodiment of the present invention, which is characterized in that the hydraulic motor is arranged as a bent axis type hydraulic motor.

In the drawings, indicated at 40 is a bent axis type hydraulic motor adopted for the present embodiment. In this instance, the hydraulic motor 40 is arranged as a vehicle drive motor, and provided with a casing 41 which is constituted by a main casing body 42 in the form of a stepped tube, and a head casing 43 which is securely fixed to an end face of a larger diameter portion of the main casing body 42.

Provided on the inner peripheral side of the main casing body 42 are stepped portions 42A and 42B which are increased stepwise in diameter toward the end on the side of the head casing 43. Provided between the stepped portions 42A and 42B are a large number of grooves 42C for engagement with non-rotating brake disks 54 which will be described hereinafter.

Indicated at 44 is an output shaft which is rotatably supported within the main casing body 42 through a couple of bearings 44A and 44B, and at 45 is a drive disk which is formed at a fore end of the output shaft 44 as an integral part thereof. Provided on the outer peripheral side of the drive disk 45 are, for example, nine axial arcuate grooves 46 in uniformly spaced angular positions around the circumference of the drive disk 45 as shown in FIG. 6. These arcuate grooves 46 are formed in a semi-circular shape having a predetermined radius of curvature.

Denoted at 47 is a cylinder block which is provided within the casing 41 and which is rotatable integrally with the output shaft 44. A plural number of cylinders 48 (only one of which is shown in the drawing) are provided in angularly spaced positions within the cylinder block 47. Pistons 49 are slidably fitted in the respective cylinders 48 of the cylinder block 47. Projected ends of the pistons 49 are rockably supported by the drive disk 45.

Indicated at 50 is a tilting support member which is securely fixed on an inner end face of the head casing 43, and at 51 is a valve plate which is interposed between the tilting support member 50 and the cylinder block 47 in sliding contact therewith. The valve plate 51 is provided with a pair of inlet/outlet ports 51A and 51B to be communicated with oil passages (not shown) which are formed in the head casing 43 and the tilting supported member 50. The valve plate 51 is turned in a tilted state on and along the tilting support member 50 together with the cylinder block 47, for example, by means of a tilt mechanism (not shown).

Designated at 52 is a center shaft which supports the cylinder block 47 between the drive disk 45 and the valve plate 51. The center shaft 52 is extended centrally through the cylinder block 47 and, at one end, rockably connected to the drive disk 45. The other end of the center shaft 52 is rotatably fitted in the valve plate 51 for centering the cylinder block 47 relative to the valve plate 51.

Indicated at 53 is a brake device adopted in the present embodiment. Similarly to the above-described prior art counterpart, the brake device 53 is constituted by non-rotating brake disks 54, rotating brake disks 55 and brake piston 60 as described below.

Indicated at 54 are a plural number of non-rotating brake disks which are provided on the inner peripheral side of the main casing body 42 between the stepped portions 42A and 42B. These non-rotating brake disks 54 are each in the form of annular disk of frictional material, and, on the outer peripheral side, are engaged with grooves 42C of the main casing body 42. Accordingly, the non-rotating brake disks 54 are axially movable relative to the main casing body 42 but restricted of rotational movements relative to the latter.

Indicated at 55 are a plural number of rotating brake disks which are provided around the outer periphery of the drive disk 45. As shown in FIG. 6, these rotating brake disks 55 are formed into the shape of annular disks by the use of frictional material substantially in the same manner as the rotating brake disks 32 in the foregoing first embodiment. Provided on the inner peripheral side of each rotating brake disk 55 are, for example, nine arcuate projections 56, six radial contacting land portions 57 and three grooves 58.

The rotating brake disks 55 are located in alternately overlapped positions relative to the non-rotating brake disks 54. The rotating brake disks 55, which have the arcuate projections 56 engaged with the arcuate grooves 46 of the drive disk 45, are movable in the axial direction but blocked against rotational movements relative to the latter.

Furthermore, as the radial contacting land portions 57 are brought into engagement with outer peripheral surfaces of the drive disk 45, the rotating brake disks 55 are blocked against movements in radial directions relative to the drive disk 45.

Indicated at 59 are three oil passages which are provided between outer peripheral surfaces of the drive disk 45 and the grooves 58. Should operating oil in the cylinders 48 leak into the casing 41 through gap spaces between the cylinders 48 and pistons 49 as it is fed to and from the respective cylinders 48, the leaked oil is guided through these oil passages 59 in the same manner as in the case of the oil passages 36 in the foregoing first embodiment, and mixed with operating oil in an oil chamber 63 and, after cooling, returned to the side of a reservoir tank through a drain passage (not shown) which is provided in the casing 41.

Indicated at 60 is a brake piston which is slidably provided on the inner peripheral side of the main casing body 42. The brake piston 60 is constantly urged toward the non-rotating and rotating brake disks 54 and 55 by a spring 61 to hold the respective non-rotating brake disks 54 in frictional engagement with the rotating brake disks 55, namely, to hold the cylinder block 47 in a braked state together with the output shaft 44. When part of pressure oil from the hydraulic pump is supplied to a liquid pressure chamber 62 which is defined between the brake piston 60 and the stepped portion 42B of the main casing body 42, the brake piston 60 is moved away from the non-rotating brake disks 54 to put the brakes off the cylinder block 47.

Denoted at 63 is an oil chamber which is formed between the bearings 44A and 44B within the main casing body 42. Oil in this oil chamber 63 is discharged from the casing 41 to a drain passage through an oil passage 59.

In the case of the hydraulic motor 40 having the brake device 53 arranged as described above, as pressure oil is supplied successively into the cylinders 48 from the hydraulic pump through the inlet/outlet ports 51A and 51B, a pressing force is generated successively and exerted on the drive disk 45 by the pistons 49. Accordingly, the cylinder block 47 which is integrally connected with the pistons 49 is put in rotation thereby to rotationally drive the output shaft 44, for example, for driving the vehicular lower body of the hydraulic excavator.

Further, by tilting the valve plate 51 along the tilted support member 50 through a tilt mechanism together with the cylinder block 47, the stroke length of the pistons 49 can be varied for adjusting the output of the motor. Further, in the same manner as in the prior art, the rotation of the cylinder block 47 is stopped by the brake device 53, and the brakes on the cylinder block 47 are canceled.

Thus, the present embodiment, which is arranged as described above, can also restrict saccadic or rattling movements, which would otherwise occur between the drive disk 45 and the rotating brake disks 55 in the radial and circumferential directions, by cooperative restrictive actions of the arcuate projections 56 and the radial contacting land portions 57. As a consequence, at the time of applying the brakes on the cylinder block 47, the impacts of collision between the arcuate grooves 46 and the arcuate projections 56 can be eased or suppressed to a suitable degree for reducing abrasive wear of the arcuate projections 56 and enhancing the durability and service life of the rotating brake disks 55, producing substantially the same operational effects as in the foregoing first embodiment.

Further, oil in the oil chamber 63 tends to stagnate between the bearings 44A and 44B under high temperature conditions. However, in the case of the present embodiment having the oil passages 59 formed between the cylinder block 47 and the grooves 58 of the rotating brake disks 55, oil in the oil chamber 63 is mixed under stirred conditions with oil in the casing 41 through the oil passages 59, and can be discharged through a drain passage in a cooled state to prevent damages to the bearings 44A and 44B and/or to oil seals.

Although the foregoing first embodiment exemplifies a case using nine arcuate grooves 17, nine arcuate projections 33 and six radial contacting land portions 34, it is to be understood that the number of the arcuate projections or radial contacting land portions can be selected arbitrarily as long as they are located circumferentially in uniformly spaced angular positions.

Figure 7:
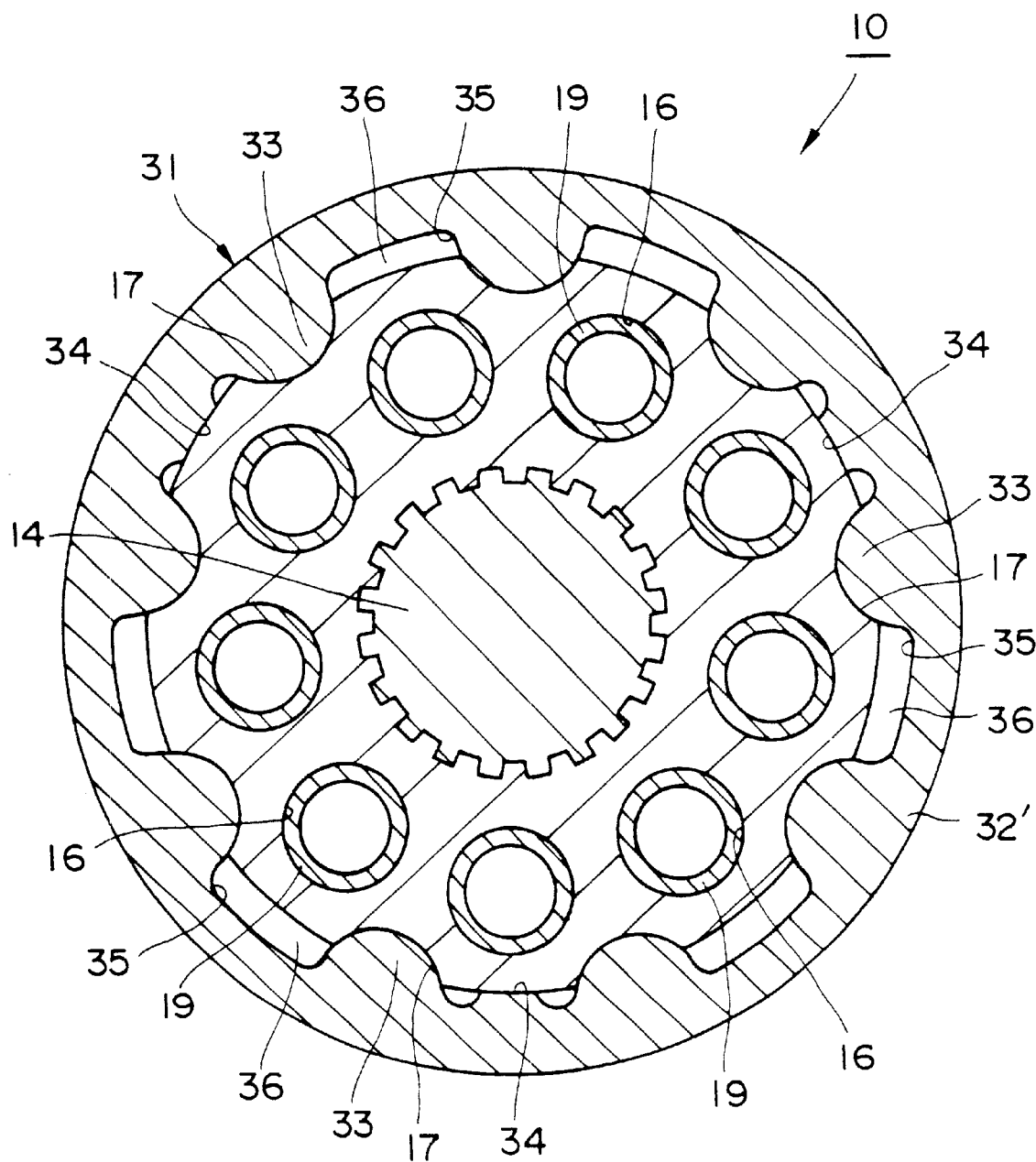
FIG. 7 is a transverse sectional view of a modified embodiment, showing cylinder block, rotating brake disks and so forth from the same position as FIG. 2.
Figure 8:
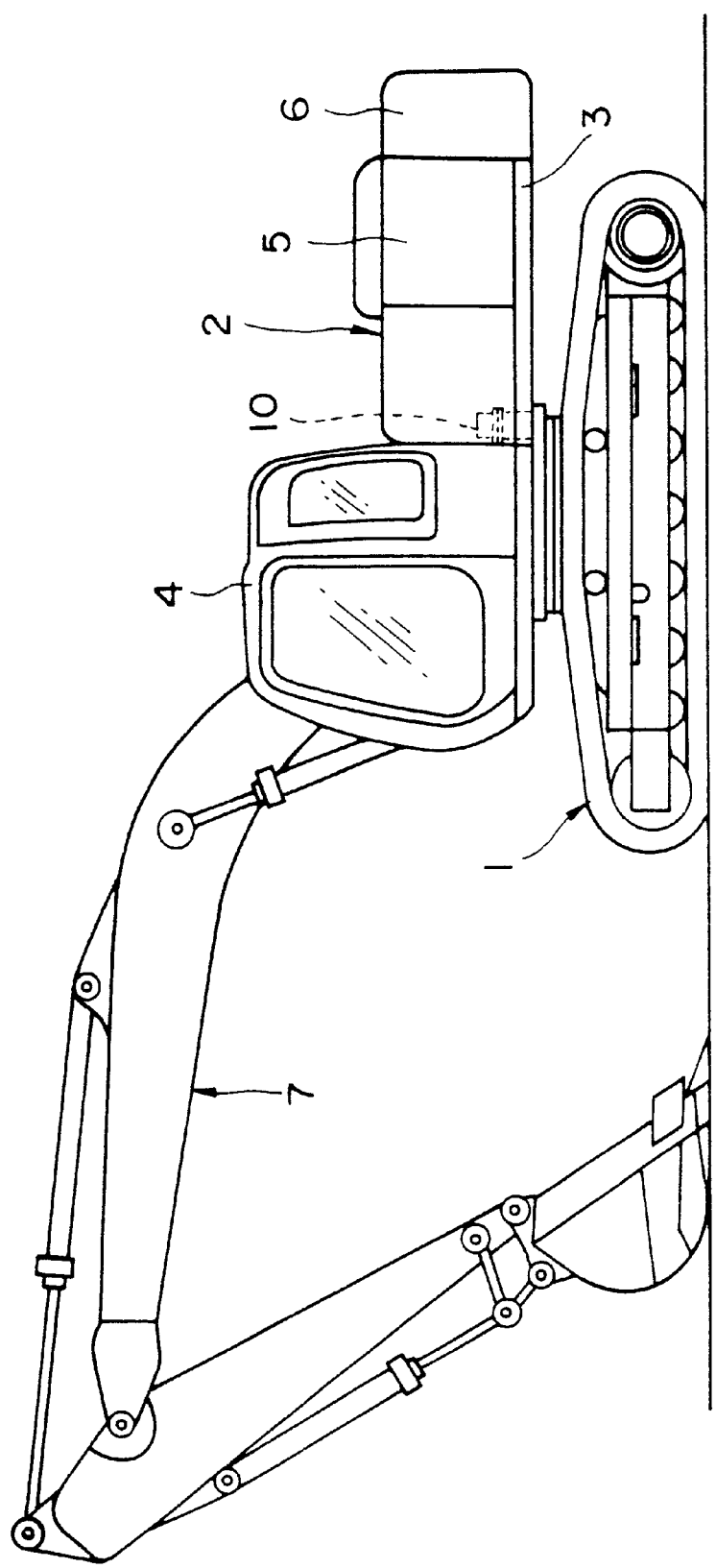
FIG. 8 is a schematic outer view of a hydraulic excavator incorporating a prior art brake device equipped hydraulic motor.
Figure 9:
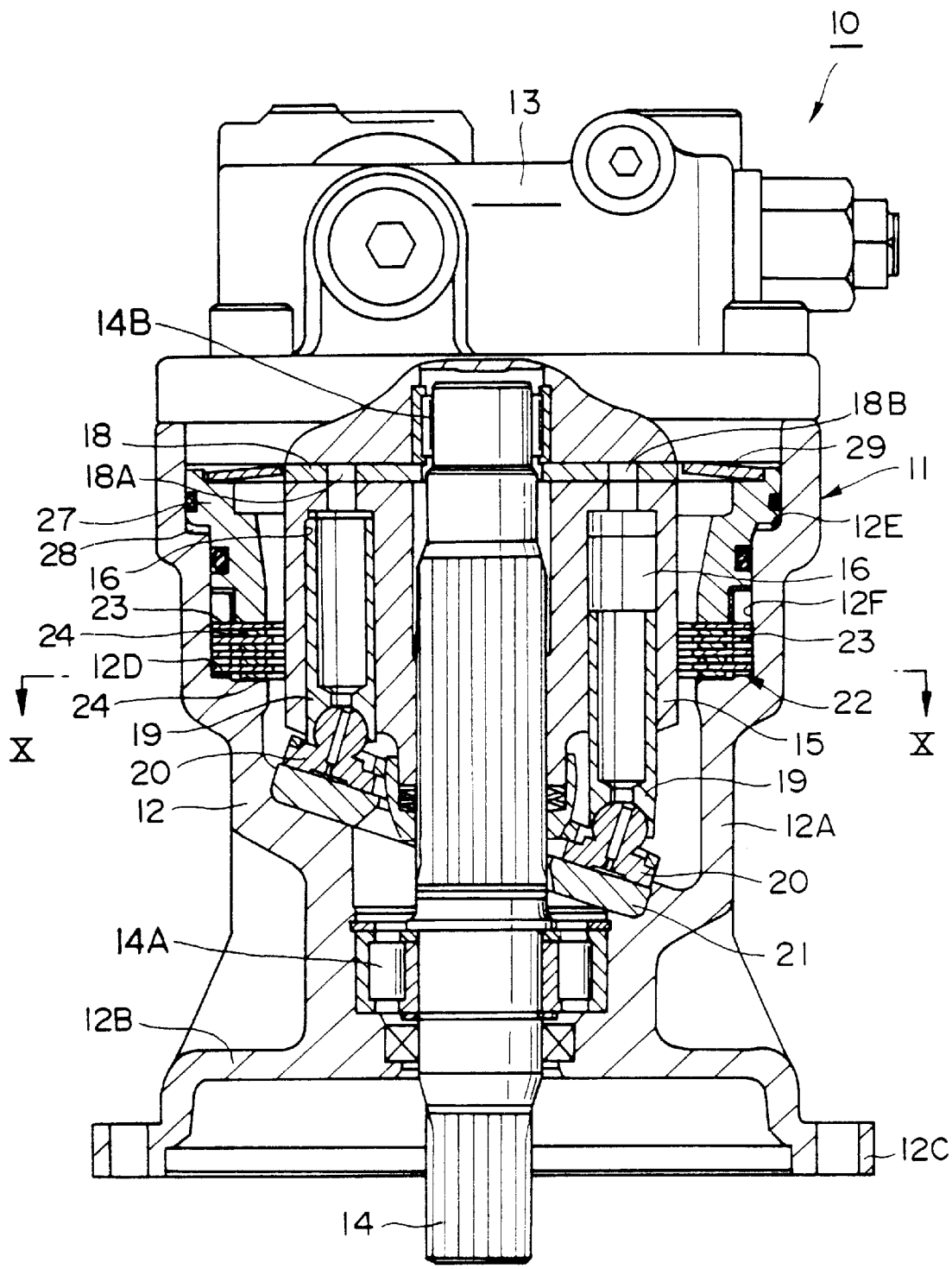
FIG. 9 is a vertical sectional view of the brake device equipped hydraulic motor of FIG. 8, taken from the direction of arrows IX—IX of FIG. 10.
Figure 10:
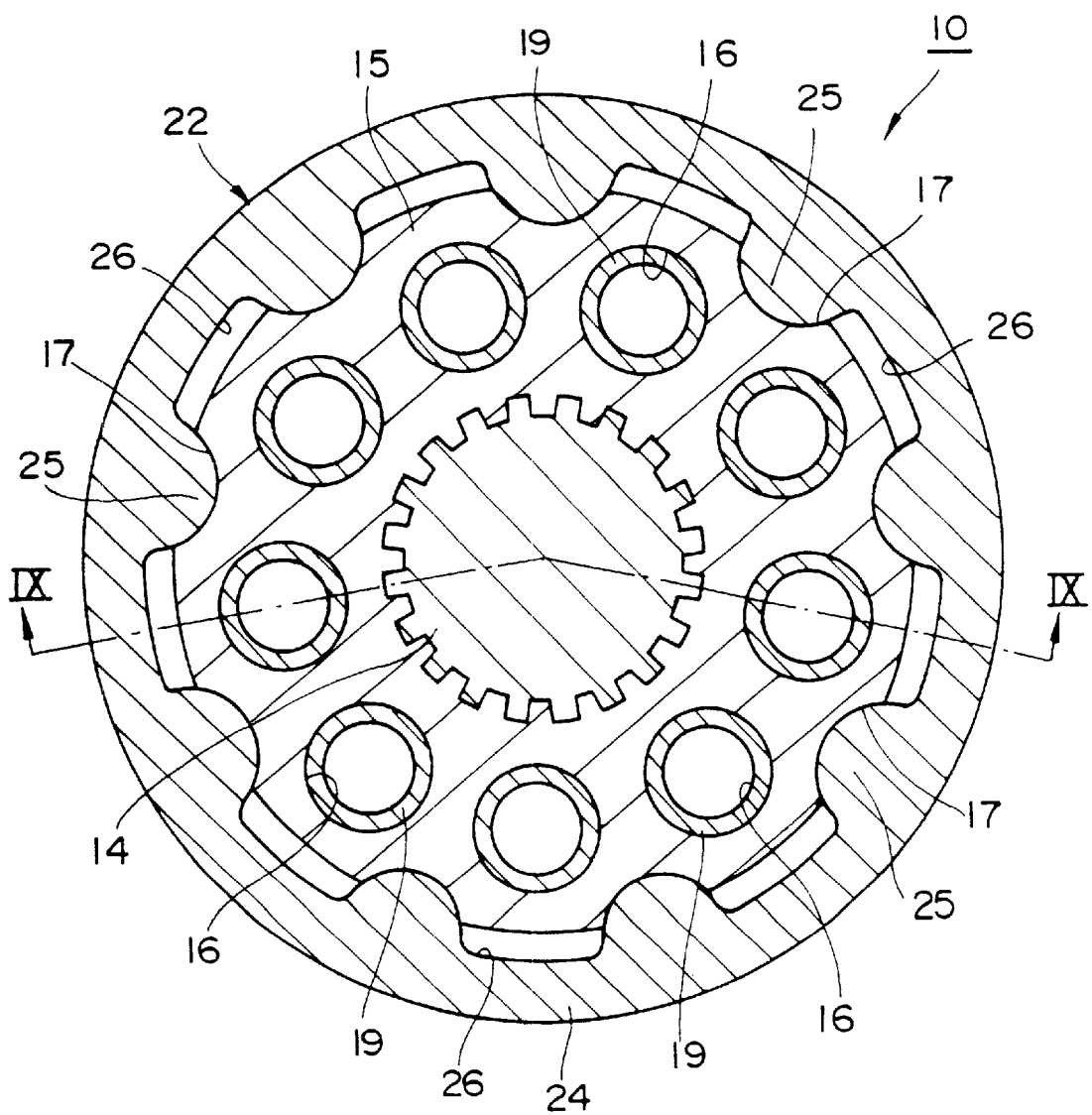
FIG. 10 is an enlarged transverse sectional view taken from the direction of arrows X—X in FIG. 9, showing cylinder block, rotating brake disks and so forth.
Figure 11:
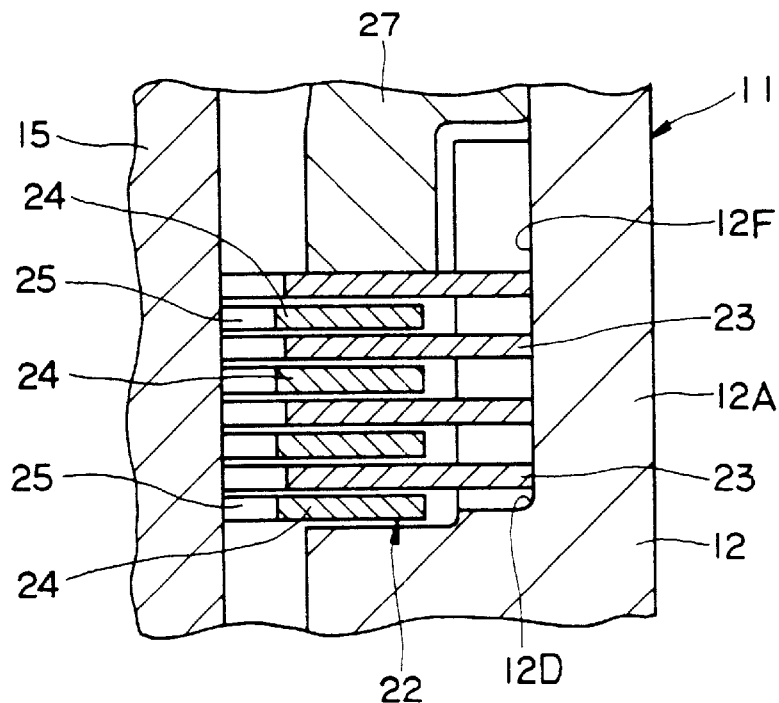
FIG. 11 is fragmentary sectional view showing on an enlarged scale a brake device of FIG. 9.
Figure 12:
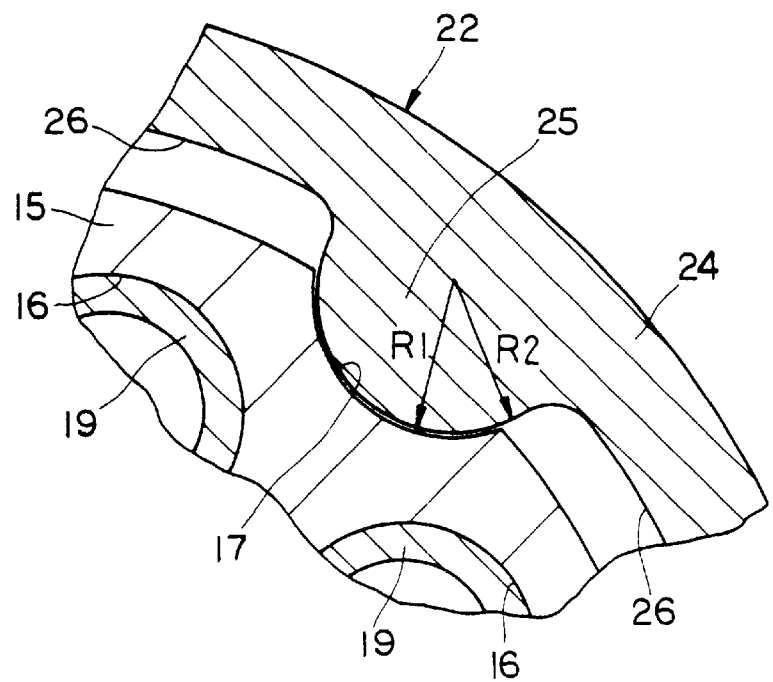
FIG. 12 is a fragmentary sectional view showing on an enlarged scale arcuate grooves and arcuate projections of FIG. 10.
Figure 13:
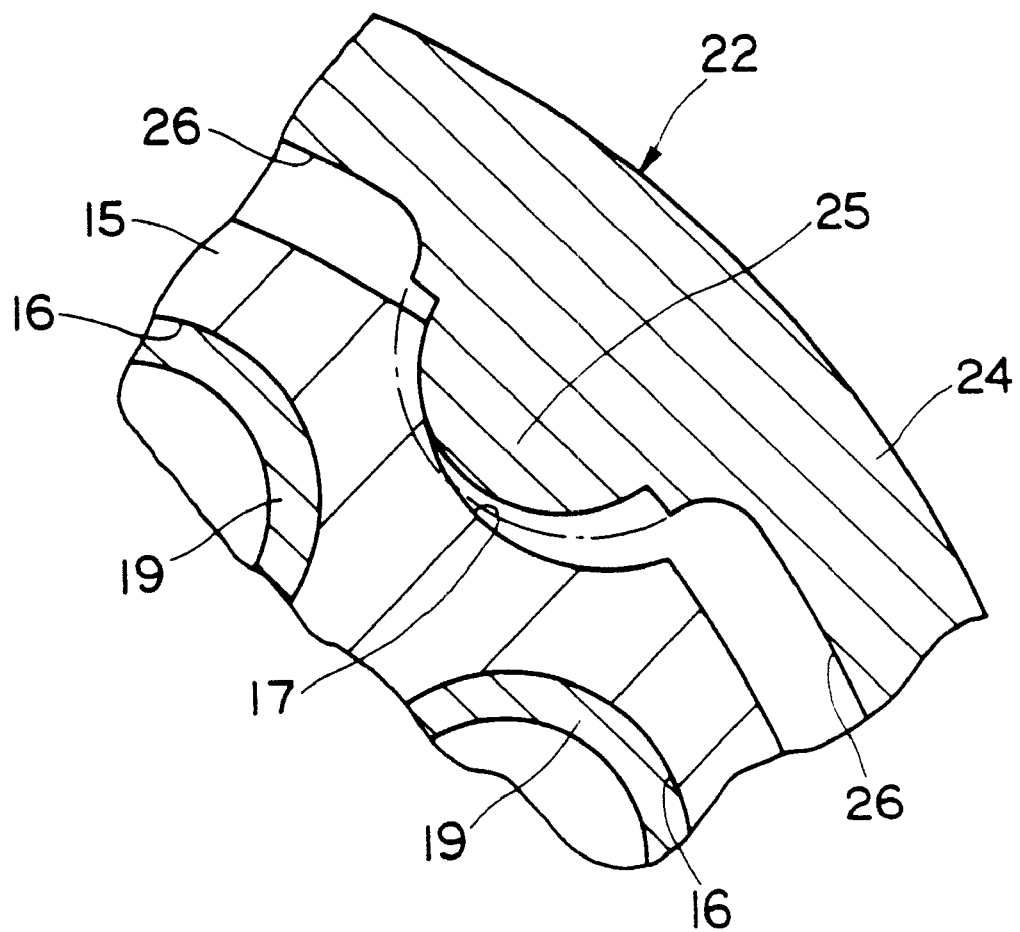
FIG. 13 is a fragmentary sectional view similar to FIG. 12, showing a worn out arcuate projection.

Further, in the foregoing first embodiment, six radial contacting land portions 34 are provided on each rotating brake disk 32. However, in place of this arrangement, for example, three radial contacting land portions 34 may be provided on rotating brake disks 32' as shown in a modification of FIG. 7. In this case, the rotating brake disks 32' can be supported in a stable state relative to the cylinder block 15. The same applies similarly to the second embodiment.

Further, in the first embodiment, the hydraulic motor 10 is applied as a drive for a rotary mechanism of a hydraulic excavator. However, needless to say, it can be applied as a vehicle drive motor.

Further, in the second embodiment described above, the hydraulic motor 40 is applied as a vehicle drive motor of a hydraulic excavator. However, of course, it can be employed as a rotary drive for rotating an upper rotary body of a hydraulic excavator.

Furthermore, an axial piston type hydraulic motor is shown in each one of the foregoing embodiments, it is to be understood that the present invention is similarly applicable to a radial piston type hydraulic motor.

Moreover, although the hydraulic motor according to the present invention is applied to a hydraulic excavator in the foregoing embodiments, it can be applied to other construction machines such as cranes, bulldozers and the like if desired.

INDUSTRIAL APPLICABILITY

As described in detail hereinbefore, according to the present invention, there is provided a hydraulic motor with a brake device, including non-rotating and rotating brake disks between a casing and a cylinder block of the hydraulic motor, the rotating brake disks being provided with a plural number of arcuate projections on an inner peripheral side thereof to restrict rotational movement of the rotating brake disks relative to the cylinder block, along with at least three radial contacting land portions which restrict radial movements of the rotating brake disks relative to the cylinder block. Accordingly, saccadic or rattling movements, which would occur between the cylinder block and the rotating brake disks in radial and circumferential directions upon applying the brakes on the hydraulic motor, can be restricted suitably by cooperative actions of the arcuate projections and the radial contacting land portions.

Namely, the above arrangements contribute to ease or lower the impacts of collision between arcuate grooves of the cylinder block and the arcuate projections, enhancing the durability and service life of the rotating brake disks and guaranteeing stable performances of the brake device over a prolonged period of time. In addition, dust of abrasion which occurs between the cylinder block and the rotating brake disks can be reduced to prevent dust of abrasion from getting, for example, onto sliding surfaces of the cylinder block to ensure high performance quality and reliability of the hydraulic motor. Furthermore, since the respective radial contacting land portions are simply in the shape of an arc having the same radius of curvature, so that they can be formed easily to a high precision level by press-forming or the like.

On the other hand, according to the present invention, there is provided a hydraulic motor with a brake device, having non-rotating and rotating brake disks between a casing and an output shaft of the motor, the rotating brake disks being provided with a plural number of arcuate projections on the inner peripheral side thereof thereby to restrict rotational movements of the rotating brake disks relative to the output shaft, along with more than radial contacting land portions which restrict radial movements of the rotating brake disks relative to the output shaft. In this case, substantially the same operational effects are obtained as in the above-described arrangements.

What is claimed is:

1. A brake device equipped hydraulic motor, comprising a casing formed in a tubular shape, an output shaft rotatably supported in said casing, a cylinder block provided in said casing and supplied with pressure oil from outside to rotationally drive said output shaft, and a brake device provided between said cylinder block and said casing to apply brakes to said output shaft, said brake device having annular non-rotating brake disks provided on an inner peripheral side of said casing, annular rotating brake disks provided axially movably on an outer peripheral side of said cylinder block in alternately overlapped relations with said non-rotating brake disks and arranged to be brought into frictional engagement with said non-rotating brake disks by a brake piston, characterized by the provision of:

a plural number of axially extending arcuate grooves provided on circumferential surfaces of said cylinder block at predetermined angular intervals in a circumferential direction thereof;

a plural number of arcuate projections provided on an inner peripheral side of and extending radially inward of said rotating brake disks and engaged with said arcuate grooves to restrict rotational movements of said rotating brake disks relative to said cylinder block; and at least three radial contacting land portions each located between said arcuate projections and arranged to be brought into contact with circumferential surfaces of said cylinder block to restrict radial movements of said rotating brake disks relative to said cylinder block; and said radial contacting land portions being formed in an arcuate shape conforming with a contour of said circumferential surfaces of said cylinder block, and arranged to face said circumferential surfaces of said cylinder block through a small gap space narrower than a gap space between said arcuate grooves and arcuate projections.

2. A brake device equipped hydraulic motor as defined in claim 1, wherein, in addition to said arcuate projections and radial contacting land portions, said rotating brake disks are provided with grooves deeper than said radial contacting land portions, providing oil passages between said grooves and said circumferential surfaces of said cylinder block.

3. A brake device equipped hydraulic motor as defined in claim 1, wherein said arcuate projections are formed in a slightly smaller radius of curvature as compared with said arcuate grooves.

4. A brake device equipped hydraulic motor, comprising a casing formed in a tubular shape, an output shaft rotatably supported in said casing, a cylinder block provided in said casing and supplied with pressure oil from outside to rotationally drive said output shaft, and a brake device provided between said output shaft and said casing to apply brakes to said output shaft, said brake device having annular non-rotating brake disks provided movably on an inner peripheral side of said casing, annular rotating brake disks provided on an outer peripheral side of said output shaft in alternately overlapped relations with said non-rotating brake disks arranged to be brought into frictional engagement with said non-rotating brake disks by a brake piston, characterized by the provision of:

a plural number of axially extending arcuate grooves provided on circumferential surfaces of said output shaft at predetermined angular intervals in a circumferential direction thereof;

a plural number of arcuate projections provided on an inner peripheral side of and extended radially inward of said rotating brake disks and engaged with said arcuate grooves to restrict rotational movements of said rotating brake disks relative to said output shaft;

at least three radial contacting land portions each located between said arcuate projections and arranged to be brought into contact circumferential surfaces of said output shaft to restrict radial movements of said rotating brake disks relative to said output shaft; and said radial contacting land portions being formed in an arcuate share conforming with a contour of said circumferential surfaces of said output shaft, and arranged to face said circumferential surfaces of said output shaft through a small gap space narrower than a gap space between said arcuate grooves and arcuate projections.

5. A brake device equipped hydraulic motor as defined in claim 4, wherein, in addition to said arcuate projections and radial contacting land portions, said rotating brake disks are provided with grooves deeper than said radial contacting land portions, providing oil passages between said grooves and said circumferential surfaces of said output shaft.

\* \* \* \* \*